United States Patent [19]

Bassi

[11] 4,380,161

[45] Apr. 19, 1983

[54] PLUG WITH A SAFETY LOCK FOR FILLERS OF FUEL RESERVOIRS OF AUTOMOTIVE VEHICLES

[75] Inventor: Alberto Bassi, Turin, Italy

[73] Assignee: ITW Fastex Italia S.p.A., Turin, Italy

[21] Appl. No.: 209,453

[22] Filed: Nov. 24, 1980

[30] Foreign Application Priority Data

Dec. 18, 1979 [IT] Italy .............................. 28098 A/79

[51] Int. Cl.³ ........................ B65D 55/14; E05B 9/08
[52] U.S. Cl. ...................................... 70/168; 70/370
[58] Field of Search ................. 70/370, 451, 158, 163, 70/166, 167, 168, 169, 170, 171, 172, 173; 220/200, 210; 248/27

[56] References Cited

U.S. PATENT DOCUMENTS 3,190,092 6/1965 Patriquim .............................. 70/370
3,985,007 10/1976 Gerdes .................................. 70/172

FOREIGN PATENT DOCUMENTS 1428528 11/1968 Fed. Rep. of Germany ........ 70/370
2060762 5/1981 United Kingdom .................. 70/370

Primary Examiner—Robert L. Wolfe
Attorney, Agent, or Firm—Jerold M. Forsberg; Thomas W. Buckman; Jack R. Halvorsen

[57] ABSTRACT

A plug assembly for a fuel filler neck includes a subassembly of a cap and latch which may be inserted in the end of a fuel filler neck without the lock assembly. Subsequent to the subassembly being installed in the fuel filler neck the lock assembly may be inserted and secured in a nonremovable fashion relative thereto rendering the fuel filler cap lockable and operable.

5 Claims, 1 Drawing Figure

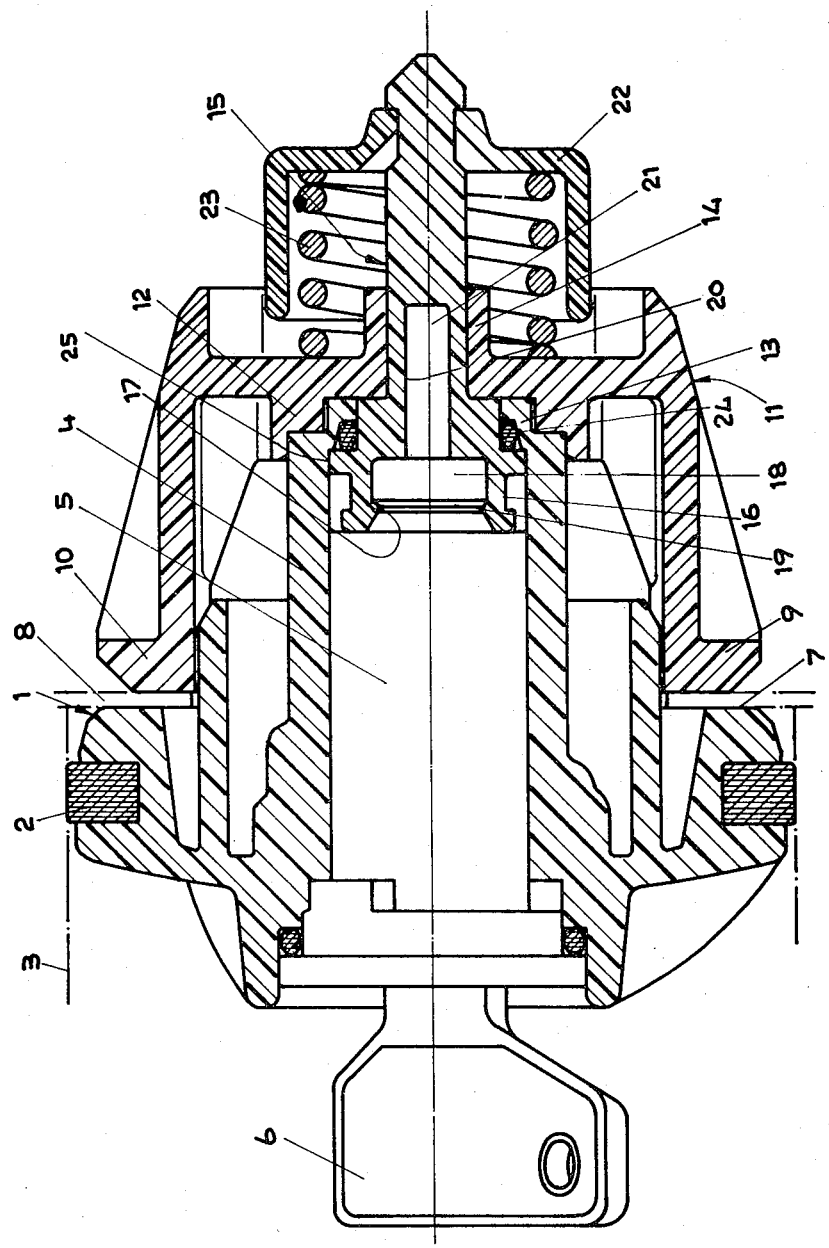

PLUG WITH A SAFETY LOCK FOR FILLERS OF FUEL RESERVOIRS OF AUTOMOTIVE VEHICLES

BACKGROUND OF THE INVENTION

The present invention relates to improvements in locking caps for fuel reservoirs for automobiles.

A typical example of prior art devices is shown by U.S. Pat. No. 3,985,007 wherein a fuel filler cap having a lock assembly is disclosed. This particular device shows a preassembled fuel filler cap and lock which the first time it is to be used is complete and subsequent usage thereof requires usage of the entire device. The particular problem encountered and being solved by this device is the theft of locking fuel caps from new vehicles prior to delivery. The instant invention provides for the intermediate assembly step of a portion of the cap assembly in the neck of the fuel tank prior to shipment of the completed vehicle at the factory. Subsequent to the delivery of the vehicle to the dealer the lock cylinder is then installed in the fuel filler cap rendering it an operable lockable device.

SUMMARY OF THE INVENTION

Disclosed herein is a cap for a fuel filler for a reservoir adapted to be used with an automobile which includes a cap with a lock receptacle, a sealing portion, a rotatable latching portion, and means to secure a lock cylinder relative to the lock receptacle and the latching portion. An advantage of the device is that the subassembly of the cap minus the locking cylinder is a functioning fuel cap device which is of a nominal value and at the time of the manufacture and assembly of the automobile is of relatively small value to a thief. Another advantage is that the lock cylinder may have a key of the same type necessary to operate the other locking cylinders used in the vehicle structure and that the locking cylinder may be installed at a later date, e.g., by the retailer at the time of sale of vehicle.

It is an object of the present invention to provide a low cost fuel filler cap assembly which may be installed in the fuel filler neck of an automobile fuel reservoir at the time of manufacture without the necessity of the locking cylinder being present.

It is a further object of the present invention to provide a fuel filler cap which will receive and fixedly secure a lock cylinder relative thereto subsequent to the final assembly of the cap structure.

It is another object of the invention to provide a fuel filler cap which when installed in the filler tube for a fuel reservoir will seal relative thereto to preclude fuel or the passage of fumes therepast.

It is an object of the present invention to provide a fuel filler cap which when inserted into the end of a fuel filler tube will permit the rotation of a latching portion without the necessity of rotating the portion of the cap which seals relative to the tube. Thus abraiding and attendant wear problems are precluded.

It is the principal object of this invention to provide a locking fuel filler cap which due to its construction and assembly in stages discourages the theft of that portion of the cap which is installed prior to final assembly.

The invention will be better understood from the following description, given merely by way of example and therefore in no limiting sense, of an embodiment thereof, by referring to the accompanying drawings.

BRIEF DESCRIPTION OF THE DRAWINGS

The FIGURE is a cross-sectional view of the fuel filler cap of the instant invention showing the key and lock cylinder relative thereof.

THE DESCRIPTION OF THE PREFERRED EMBODIMENT

Referring now to the drawing, there is shown a plug comprising essentially a housing or cap 1 including a peripheral seal 2 intended to seal against the inside of a fuel filler neck 3 (shown in phantom lines). The filler neck 3, is the filler for a fuel reservoir of the type used with an automotive vehicle. The housing 1 has a tubular portion 4 for receiving a cylinder lock 5. The lock cylinder 5 is of the type having an axially extending locking arrangement requiring a key 6 for actuation. Rotatably positioned around the one end of the tubular portion 4 is a latch 11. The latch 11 includes fins 9 and 10 adapted to engage the backside of a flange 8 which is an integral part of the fuel filler neck assembly. The latch 11 includes an annular boss 12 which receives therein a reduced diameter end 13 of the tubular portion 4. A head 16 adapted to maintain the lock cylinder 5 relative to the tubular portion includes an undercut seat 17. Lock cylinder 5 includes a lock portion 18 having an annular groove 19 therein. The lock portion 18 being adapted to be received with the undercut cooperating with said annular groove 19 to secure said cylinder 5 within said tubular portion 4. The head 16 includes an extending shank 15 which extends through a hub 14 formed as part of the latch 11. Shank 15 includes an enlarged end opposite to that end which includes the head 16, the enlarged end being adapted to cooperate with cup 22 and operating as an abutment for tension spring 23 interposed between the cup 22 and the latch 11. Head 16 includes a sealing ring 24 arranged to seal between a flange 25 formed as part of the head 16 and a frustoconical section of the inner wall of the tubular portion 4. The undercut seat 17 is formed in the head 16 and the shank 15 has a blind bore 20 communicating therewith. The blind bore is of a non-circular configuration and preferably of a square cross-sectional configuration and is adapted to receive a complimentary shaped pin element 21. Because of the polygonal cross-section of the pin 21 and the blind bore 20, a rotation of the shank 15 will cause a rotation of the latch 11.

Rotation of shank 15 and latch 11 causes fins 9 and 10 to move simultaneously with a camming motion, now shown, against the flange 8 of the filler neck. Thus as the latching portion is rotated relative to the flange 8 the cap 1 is drawn axially within the neck to abut against the opposite side of the flange 8.

In use, the preassembled housing 1 and latch 11 may be installed in the open end of a filler neck assembly by using a tool having an end complimentary to the cross-sectional dimension and shape of blind bore 20. Thus the fuel filler cap may be installed in the end of the neck without the lock cylinder 5 and key 6 rendering the fuel cap difficult to remove without an appropriate tool and of little or no value to a thief without the lock cylinder and key. Subsequent to the installation of the preassembled portion of the fuel cap, the lock cylinder 5 and key 6 may be installed by simple alignment of the lock cylinder 5 with the tubular portion 4 and the axial insertion therein. Thus when portion 18 engages and snaps within the undercut seat 17 the pin 21 is positioned within the blind bore 20. After final assembly of the lock cylinder within the fuel cap rotation of the key 6 will result in rotation of shank 15 and of latch 11 relative to plug housing 1. Accordingly, it will be seen that the cap assembly may be inserted in the end of a typical fuel filler neck and that the latch portion 11 when rotated relative to the flange 8 causes the latch portion to move behind the flanges to lock the device relative thereto. By incorporating common camming concepts the face 7 of the bottom side of housing portion 1 will be drawn towards each latch portion 9 and 10 thereby clamping flange 8 therebetween positively and thus locking the assembly within the filler neck.

While but one embodiment of the invention has been illustrated and described, it will be obvious to a person of ordinary skill in the art that a number of changes and modifications may be made without departing from the scope of the invention as defined by the claims.

What I claim is:

1. A closure plug for closing the end of a filler tube for a container comprising a plug means and a locking means, said plug means including cap means having a peripheral seal for engaging and sealing within the filler tube, a centrally disposed bore in said cap means, a rotatably received shank means received within and extending from the bottom end of said bore, latch means circumferentially disposed relative to the end of said bore engaged by and movable in response to rotative movement of said shank means said locking means including a key actuatable lock, a depending portion having a locking groove means therein, and an axially extending drive means, cooperating means within said bore adapted to engage said groove means and thereby secure said locking means within said bore, said shank means further including complimentary means for engagement by said drive means; whereby said plug means is insertable in a filler neck and secured therein by a tool, and said locking means may thereafter be inserted into the bore and non-removably secured therein thereby rendering said closure plug operable and lockable.

2. A closure plug as set forth in claim 1 including seal means between said bottom end of said bore and said rotatable shank means.

3. A closure plug as set forth in claim 2 including spring means biasing said shank means against said sealing means whereby positive sealing is maintained during rotative movement of said shank means relative to said bore.

4. A closure plug as set forth in claim 1 wherein said locking groove extends continuously around the depending portion.

5. A closure plug as set forth in claim 1 wherein said complimentary means and said drive means have a polygonal cross-sectional configuration.

* * * * *